US008713311B1

(12) United States Patent
Roskind (10) Patent No.: US 8,713,311 B1
(45) Date of Patent: Apr. 29, 2014

(54) ENCRYPTION USING ALTERNATE AUTHENTICATION KEY

(71) Applicant: Google Inc., Mountain View, CA (US)

(72) Inventor: James Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 45 days.

(21) Appl. No.: 13/671,508

(22) Filed: Nov. 7, 2012

(51) Int. Cl.
*H04L 29/06* (2006.01)

(52) U.S. Cl.
USPC .......................................................... 713/161

(58) Field of Classification Search
USPC ............ 713/161, 171; 726/2, 5; 380/255, 277
See application file for complete search history.

(56) References Cited

U.S. PATENT DOCUMENTS

| 5,657,390 | A | * | 8/1997 | Elgamal et al. | 713/151 |
| 6,920,556 | B2 | * | 7/2005 | Kuehr-McLaren et al. | 713/151 |
| 6,996,841 | B2 | * | 2/2006 | Kadyk et al. | 726/12 |
| 7,228,412 | B2 | * | 6/2007 | Freed et al. | 713/153 |
| 7,240,203 | B2 | * | 7/2007 | Kessler et al. | 713/171 |
| 7,529,933 | B2 | * | 5/2009 | Palekar et al. | 713/168 |
| 8,577,039 | B2 | * | 11/2013 | Matsuo | 380/268 |
| 2006/0041938 | A1 | * | 2/2006 | Ali | 726/14 |
| 2009/0327696 | A1 | * | 12/2009 | Hatlelid et al. | 713/151 |
| 2012/0250866 | A1 | * | 10/2012 | Matsuo | 380/279 |

OTHER PUBLICATIONS

"Transport Layer Security", Wikipedia—The Free Encyclopedia, last modified Nov. 4, 2012, retrieved from <http://en.wikipedia.org/wiki/Transport_Layer_Security>.
"Datagram Transport Layer Security", Wikipedia—The Free Encyclopedia, last modified Aug. 2, 2012, retrieved from <http://en.wikipedia.org/wiki/Datagram_Transport_Layer_Security>.

* cited by examiner

*Primary Examiner* — Ali Abyaneh
(74) *Attorney, Agent, or Firm* — McDermott Will & Emery LLP (57) ABSTRACT

Methods for changing authentication keys when transmitting data are provided. In one aspect, a method includes receiving a first data packet including a first sender-generated authentication value generated using a first authentication key, and a first message encrypted using a first encryption key, and receiving an indication that subsequent packets will include authentication values generated using a second authentication key. The method also includes receiving a second packet includes a second sender-generated authentication value and an encrypted second message, and applying the second authentication key to the second packet to generate a recipient-generated authentication value. The encrypted second message is decrypted if these two authentication values match. Otherwise, the first authentication key is applied to the second packet to generate another recipient-generated authentication value. If these two authentication values match, the encrypted message is decrypted using the first encryption key. Systems and machine-readable media are also provided.

18 Claims, 5 Drawing Sheets

ENCRYPTION USING ALTERNATE AUTHENTICATION KEY

BACKGROUND

1. Field

The present disclosure generally relates to the transmission of data over a network, and more particularly to the use of a computing device to communicate over a network.

2. Description of the Related Art

Encryption for communications channels, such as those operating under the Secure Sockets Layer (SSL) or Transport Layer Security (TLS) protocols, often function by permitting a sender to transmit a data packet including an encrypted message and a Message Authentication Code (MAC) value ("checksum" or "tag") to a recipient. The sender and recipient share an encryption key and a MAC key, which is a keyed (cryptographic) hash function, defined in a shared cipher specification. The message is initially encrypted by the sender using the shared encryption key, and the MAC value is generated by the sender by applying a MAC algorithm to the encrypted message using the shared MAC key. Upon receipt of the data packet, the recipient applies the MAC algorithm using the shared MAC key to the encrypted message to generate a MAC value. The MAC value generated by the recipient is compared to the MAC value generated by the sender that was received with the encrypted message. If the MAC values match, the encrypted message is determined be authentic (i.e., from the correct sender). The MAC value protects both the data integrity of a message as well as its authenticity by allowing recipients that share the MAC key to detect any changes to the message content.

Such communications channels periodically need to change the encryption key (i.e., and associated encryption algorithm) being used. Changing the encryption key is commonly achieved using a Change Cipher Specification (CCS) message (or "key exchange protocol") in a protocol like SSL or TLS. Such a procedure relies on in-order-delivery of data packets that underlies a transport channel like the Internet Protocol Suite (TCP/IP). In-order-delivery requires retransmission of a lost packet, which adds notable latency to all packets after a packet loss. Furthermore, if a data packet including the CCS message is lost, then the recipient must wait until the CCS message is retransmitted and received in order to authenticate subsequent data packets.

SUMMARY

According to one embodiment of the present disclosure, a computer-implemented method for changing authentication keys when transmitting data is provided. The method includes receiving a first data packet that includes a first sender-generated authentication value generated using a first authentication key, and a first message encrypted using a first encryption key, and receiving an indication that subsequent data packets will include authentication values generated using a second authentication key. The method also includes receiving a second data packet that includes a second sender-generated authentication value and an encrypted second message, and applying the second authentication key to the second data packet to generate a recipient-generated authentication value. The encrypted second message is decrypted when the recipient-generated authentication value that is generated using the second authentication key matches the second sender-generated authentication value. When the recipient-generated authentication value that is generated using the second authentication key generated does not match the second sender-generated authentication value, the first authentication key is applied to the second data packet to generate another recipient-generated authentication value. When the recipient-generated authentication value that is generated using the first authentication key matches the second sender-generated authentication value, the encrypted message is decrypted using the first encryption key.

According to another embodiment of the present disclosure, a system for changing authentication keys when transmitting data is provided. The system includes a memory that includes instructions, and a processor. The processor is configured to execute the instructions to receive a first data packet that includes a first sender-generated authentication value generated using a first authentication key, and a first message encrypted using a first encryption key, and receive a cipher specification notification indicating that subsequent data packets will include authentication values generated using a second authentication key. The processor is also configured to execute the instructions to receive a second data packet that includes a second sender-generated authentication value and an encrypted second message, and apply the second authentication key to the second data packet to generate a recipient-generated authentication value. The encrypted second message is decrypted when the recipient-generated authentication value that is generated using the second authentication key matches the second sender-generated authentication value. When the recipient-generated authentication value that is generated using the second authentication key generated does not match the second sender-generated authentication value, the first authentication key is applied to the second data packet to generate another recipient-generated authentication value. The encrypted message is decrypted using the first encryption key when the recipient-generated authentication value that is generated using the first authentication key matches the second sender-generated authentication value. The first authentication key and the second authentication key include MAC keys. The first authentication key and the first encryption key are included in a first cipher specification.

According to a further embodiment of the present disclosure, a machine-readable storage medium includes machine-readable instructions for causing a processor to execute a method for changing authentication keys when transmitting data is provided. The method includes receiving a first data packet that includes a first sender-generated authentication value generated using a first MAC authentication key, and a first message encrypted using a first encryption key, and receiving a cipher specification notification over an encrypted channel indicating that subsequent data packets will be generated according to a cipher specification includes a second MAC authentication key and a second encryption key. The method also includes transmitting an acknowledgement that the cipher specification notification has been received, and receiving a second data packet that includes a second sender-generated authentication value and an encrypted second message. The method further includes applying the second authentication key to the second data packet to generate a recipient-generated authentication value. The encrypted second message is decrypted using the second MAC encryption key when the recipient-generated authentication value that is generated using the second authentication key matches the second sender-generated authentication value. When the recipient-generated authentication value that is generated using the second authentication key generated does not match the second sender-generated authentication value, the first authentication key is applied to the second data packet to generate another recipient-generated authentication value.

The encrypted message is decrypted using the first encryption key when the recipient-generated authentication value that is generated using the first authentication key matches the second sender-generated authentication value.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

To minimize latency of transmissions, it is desirable to design an authentication system that does not require retransmission of a lost data packet, such as a data packet including a CCS message, prior to deciphering future packets. It is also desirable that the transition to a new cipher specification be private, and not visible to a third party. The disclosed system uses at least two MAC keys to verify the authenticity of messages transmitted during a transition from a first encryption key to a second encryption key. The disclosed system functions independent of the order of the received packets. Each MAC key has an associated cipher specification. A sender and recipient each agree within an encrypted channel to use of the cipher specifications. Upon agreement, the sender may transition from using an old cipher specification to a new cipher specification for the transmission of data packets that include an encrypted message and a MAC value. The sender may signal this transition to the recipient by using a MAC key associated with the new cipher specification instead of a MAC key associated with the old cipher specification when generating the data packet for transmission.

When the recipient receives and processes the encrypted message, it can use both the MAC key associated with the old cipher specification and the MAC key associated with the new cipher specification. If processing the encrypted message using the MAC key associated with the new cipher specification results in a MAC value matching the MAC value received with the encrypted message, then future data packets (i.e., data packets having a subsequent packet number) received from the sender may be processed according to the new cipher specification. If processing the encrypted message using the MAC key associated with the old cipher specification results in a MAC value matching the MAC value received with the encrypted message, then future data packets received from the sender may continue to be processed using the old cipher specification until processing a new encrypted message using the MAC key associated with the new cipher specification results in a MAC value matching the MAC value received with the new encrypted message. In certain aspects, an Authenticated Encryption with Associated Data (AEAD) block cipher mode may be used as the cipher specification. With AEAD, selection of appropriate authentication and encryption keys is made by trying a plurality of authentication keys and encryption keys. Thus, in certain aspects, an AEAD may be used instead of a discrete pair of an authentication key and an encryption key.

Figure 1:
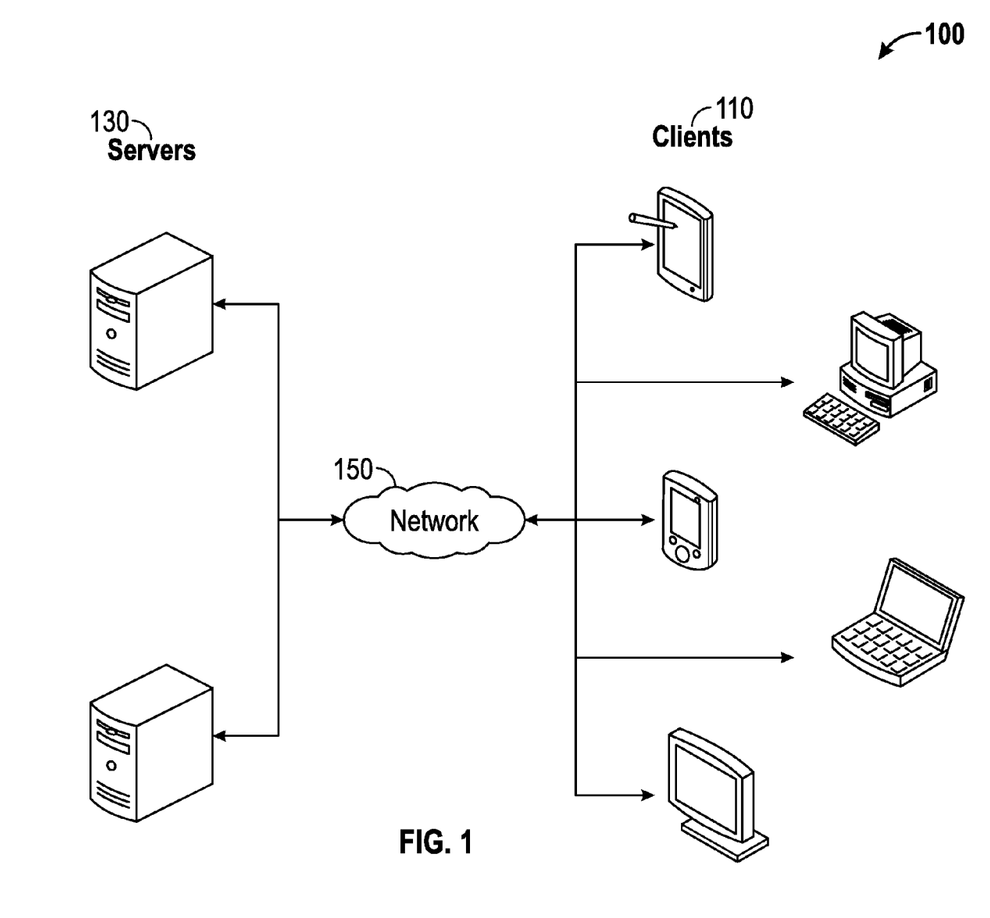
FIG. 1 illustrates an example architecture for changing authentication keys when transmitting data.

FIG. 1 illustrates an example architecture 100 for changing authentication keys when transmitting data. The architecture 100 includes servers 130 and clients 110 connected over a network 150.

One of the many servers 130 is configured to host a server-side application for transmitting data using authentication keys and encryption keys. For example, a server 130, when intending to transmit a message to a client 110, may be configured by the server-side application to encrypt the message using a first encryption key and generate a server-generated authentication value for the encrypted message using a first authentication key. The first encryption key and the first authentication key are "shared" between the server 130 and the client 110 in that the server 130 and the client 110 are both aware of the first encryption key and the first authentication key. The first encryption key and first authentication key are generally private keys, although in certain aspects they may be public keys. The server 130 may then send a data packet including the encrypted data and the authentication value to a client 110 over the network 150.

The servers 130 can be any device having an appropriate processor, memory, and communications capability for hosting the server-side application. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

For purposes of load balancing, multiple servers 130 can host the server-side application either individually or jointly. For example, one server 130 may be configured to encrypt data using a first encryption key, another server 130 may be configured to generate an authentication value using a first authentication key, and yet another server 130 may be configured to transmit a data packet including the encrypted data and the first authentication key.

Each of the many clients 110 is configured to host a client-side application for receiving data generated using authentication keys and encryption keys. For example, a client 110, upon receiving a data packet including encrypted data and a server-generated authentication value, may be configured by the client-side application to determine the authenticity of the encrypted data by generating a client-generated authentication value using the shared first authentication key. If the client-generated authentication value matches the server-generated authentication value, then the encrypted data is deemed to be authentic, the client 110 may then decrypt the encrypted data using the shared first encryption key. If the client-generated authentication value does not match the server-generated authentication value, then the encrypted data is deemed to be fake, and the client 110 disregards the data packet.

The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities for hosting the client-side application.

The server 130 and the client 110 may agree to change use of an authentication key and encryption key from the first authentication key and the first encryption key to a second authentication key and a second encryption key for subsequent messages. For example, a server 130, upon agreement to change to the second authentication key and the second encryption key, is configured by the server-side application to encrypt a subsequent message using the second encryption key and generate a server-generated authentication value for the encrypted message using the second authentication key. The server 130 may then send a subsequent data packet including the encrypted data and the authentication value.

The client 110 is configured by the client-side application to determine the authenticity of the encrypted data of the subsequent data packet when received by generating a client-generated authentication value using the shared second authentication key. If the client-generated authentication value using the second authentication key matches the server-generated authentication value, then the encrypted data is deemed to be authentic, and the client 110 then decrypts the encrypted data using the shared second encryption key. The client 110 may then use the second authentication key and the second encryption key for each received data packet having a packet number greater than the number of the received subsequent data packet.

If the client-generated authentication value using the second authentication key does not match the server-generated authentication value, then the client 110 generates a client-generated authentication value using the shared first authentication key. This may occur, for example, to determine whether the subsequent packet was received out of order. Out of order packet receipt may occur when, for example, the server 130 sends a first data packet using a first authentication key and first encryption key to the client 110 before the server 130 sends a second data packet using a second authentication key and second encryption key to the client 110, but the client 110 receives the second data packet before the first data packet due to, for example, latency on the network 110, lost data, data corruption, etc.

If the client-generated authentication value using the first authentication key matches the server-generated authentication value, then the encrypted data is deemed to be authentic, and the client 110 then decrypts the encrypted data using the shared first encryption key. If the client-generated authentication values using the first authentication key and using the second authentication key do not match the server-generated authentication value, then the encrypted data is deemed to be fake, and the client 110 disregards the data packet.

Figure 2:
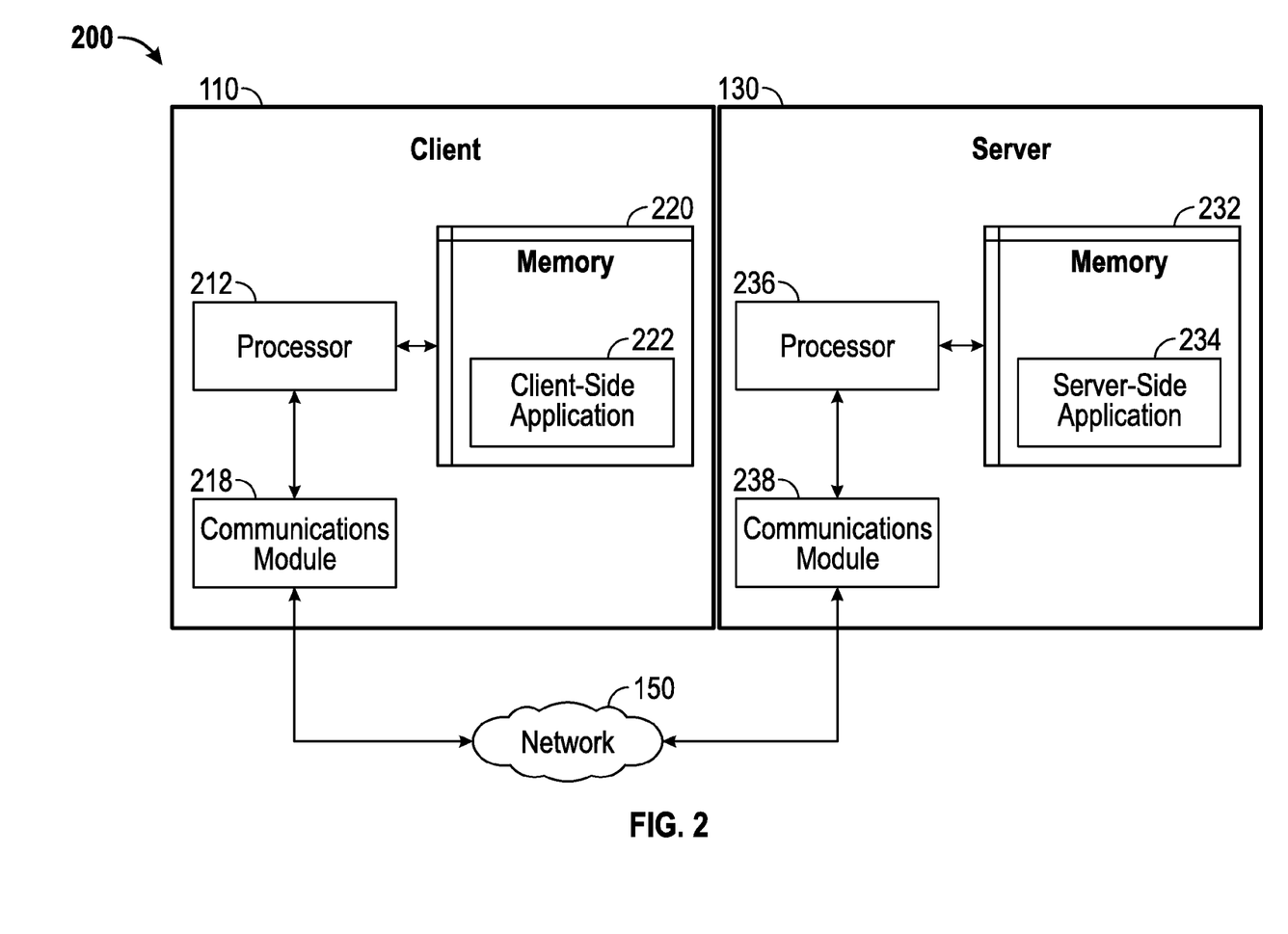
FIG. 2 is a block diagram illustrating an example client and server from the architecture of FIG. 1 according to certain aspects of the disclosure.

FIG. 2 is a block diagram illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232 that includes a server-side application 224. The processor 236 of the server 130 is configured to execute instructions, such as instructions physically coded into the processor 236, instructions received from software in memory 232 (e.g., the server-side application 234), or a combination of both. For example, the processor 236 of the server 130 executes instructions to change authentication keys when transmitting data. The instructions include configuring the processor 236 to apply a first authentication key to a first data packet to generate a first sender-generated authentication value, and send the first data packet including the first sender-generated authentication value and a first message encrypted using a first encryption key to the client 110. The first authentication key can be a MAC key. Additionally, the first authentication key and the first encryption key may be part of a first cipher specification that is agreed to between the server 130 and the client 110. The first data packet may include a first packet number as part of a packet header that may also include, for example, a total number of packets, data type, and relevant network addresses.

The instructions also include configuring the processor 236 of the server 130 to send an indication (e.g., to the client 110) that subsequent data packets will include authentication values using a second authentication key. The second authentication key can also be a MAC key. The indication that subsequent data packets will include authentication values generated using the second authentication key may be transmitted to the client 110 using an encrypted channel over the network 150. The second authentication key and the second encryption key may be part of a second cipher specification that is agreed to between the server 130 and the client 110 over the encrypted channel, and may indicate that subsequent data packets will be generated according to the second cipher specification. Additionally, the indication may be sent, for example, as a cipher specification notification indicating the subsequent data packets will optionally include authentication values generated using a different authentication key.

The instructions further include configuring the processor 236 of the server 130 to apply the second authentication key to a second data packet to generate a second sender-generated authentication value, and send the second data packet including the second sender-generated authentication value and an encrypted second message (e.g., to the client 110). The second data packet may include a second packet number that succeeds the first packet number of the first data packet.

The client 110 includes a processor 212, the communications module 218, and the memory 220 that includes the client-side application 222. The client 110 may also include an input device, such as a keyboard or mouse, and an output device, such as a display. The processor 212 of the client 110 is configured to execute instructions, such as instructions physically coded into the processor 212, instructions received from software (e.g., the client-side application 222) in memory 240, or a combination of both. For example, the processor 212 of the client 110 executes instructions to change authentication keys when transmitting data. The instructions include configuring the processor 212 to receive the first data packet (e.g., from the server 130) that includes the first sender-generated authentication value generated using the first authentication key, and the first message encrypted using the first encryption key. The instructions also include configuring the processor 212 to receive (e.g., from the server 130) an indication, such as a cipher specification notification, that subsequent data packets will include authentication values generated using the second authentication key.

In certain aspects, the instructions include configuring the processor 212 to transmit, in response to receiving the indication, an acknowledgement that the indication has been received by the client 110. For example, the server 130 may be aware for some time that subsequent data packets are to be generated using a second cipher specification instead of a first cipher specification, but the client 110 may have lost or not yet received the indication from the server 130 to change to the second cipher specification. The server 130 may then delay generating data packets using the second cipher specification until an acknowledgement is received from the client 110 that the client 110 has agreed to the second cipher specification. As a result, delayed use of the second cipher specification by the server 130 prevents the stream of data packets from the server 130 to the client 110 from stalling pending retransmission of the indication (e.g., the cipher specification notification) from the server 130 to the client 110.

The instructions include configuring the processor 212 to receive a second data packet including a second sender-generated authentication value and an encrypted second message, and applying the second authentication key (e.g., included with the indication received by the client 110) to the second data packet to generate a recipient-generated authentication value. When the recipient-generated authentication value that is generated using the second authentication key matches the second sender-generated authentication value, the processor 212 is configured to decrypt the encrypted second message using, for example, the second encryption key included with the indication received by the client 110. The processor 212 is also configured to apply the second authentication key to each data packet received from the server 130 that includes a packet number successive to the first packet number.

When the recipient-generated authentication value that is generated using the second authentication key generated does not match the second sender-generated authentication value, the processor 212 is configured to apply the first authentication key to the second data packet to generate another recipient-generated authentication value. When the recipient-generated authentication value that is generated using the first authentication key matches the second sender-generated authentication value, the processor 212 is configured to decrypt the encrypted message using the first encryption key. When the recipient-generated authentication values that are generated using the first authentication key and the second authentication key do not match the second sender-generated authentication value, the processor 212 is configured to disregard the second data packet.

In certain aspects, the first authentication key is a public (or "default") authentication key and the second authentication key is a private authentication key. For example, a public MAC key and associated cipher specification may be used to construct an authentication value for the client 110 to confirm data packet authenticity. A transition to a private ("non-public" or "secret") MAC and associated cipher specification may be made by the server 130 using the private MAC key and associated cipher specification for data packets generated subsequent to the server 130 reaching an agreement with the client 110 regarding the private MAC key and associated cipher specification.

Figure 3:
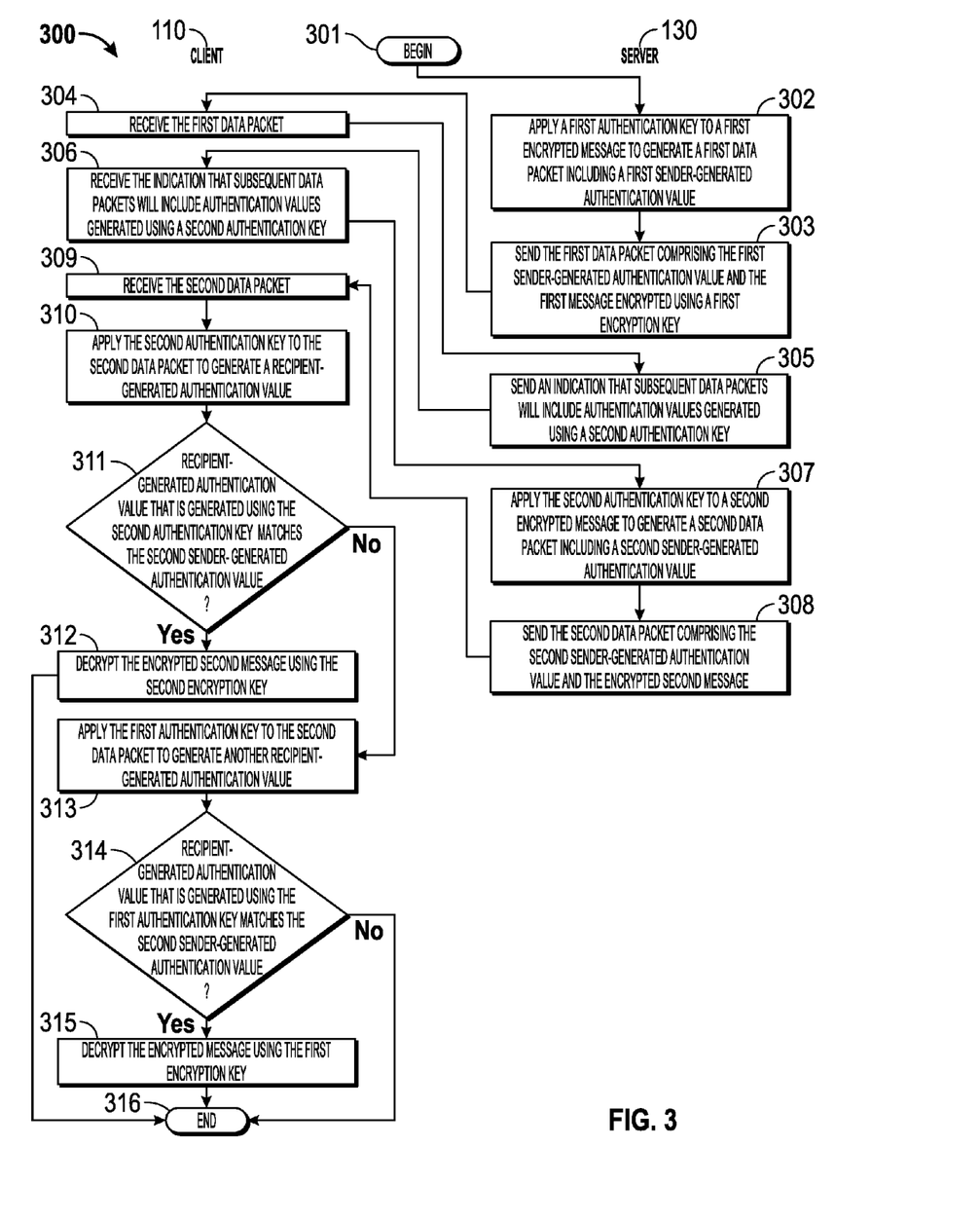
FIG. 3 illustrates an example process for changing authentication keys when transmitting data using the example client and server of FIG. 2.

FIG. 3 illustrates an example process 300 for changing authentication keys when transmitting data using the example client 110 and server 130 of FIG. 2. While FIG. 3 is described with reference to FIG. 2, it should be noted that the process steps of FIG. 3 may be performed by other systems. The process 300 begins by proceeding from beginning step 301 when data is to be transmitted from the server 130 to the client 110 to step 302 when a first authentication key is applied by the server-side application 234 of the server 130 to a first encrypted message to generate a first sender-generated authentication value. In step 303, the server 130 sends the first data packet including the first sender-generated authentication value and the first message encrypted using a first encryption key to the client 110.

Turning to the client 110, in step 304 the client 110 receives the first data packet. Returning to the server 130, in step 305 the server 130 sends an indication to the client 110 that subsequent data packets will include authentication values generated using a second authentication key. Returning to the client 110, in step 306 the client receives the indication that subsequent data packets will include authentication values generated using a second authentication key.

In step 307, the server 130 applies the second authentication key to a second encrypted message to generate a second sender-generated authentication value, and in step 308 sends the second data packet including the second sender-generated authentication value and the encrypted second message to the client 110.

In step 309, the client 110 receives the second data packet and in step 310 applies the second authentication key to the second data packet to generate a recipient-generated authentication value. If it is determined in decision step 311 that the recipient-generated authentication value that is generated using the second authentication key matches the second sender-generated authentication value, the process 300 proceeds to step 312 in which the client decrypts the encrypted second message using the second encryption key and the process 300 ends in step 316.

If it is determined in decision step 311 that the recipient-generated authentication value that is generated using the second authentication key does not match the second sender-generated authentication value, the client 110 in step 313 applies the first authentication key to the second data packet to generate another recipient-generated authentication value and the process 300 proceeds to decision step 314.

Next, in decision step 314, if it is determined that the recipient-generated authentication value that is generated using the first authentication key matches the second sender-generated authentication value, then the process 300 proceeds to step 315 in which the encrypted message of the second data packet is decrypted using the first encryption key. If it is determined in decision step 314 that the recipient-generated authentication value that is generated using the first authentication key does not match the second sender-generated authentication value, then the process 300 ends in step 316, thereby disregarding the second data packet.

FIG. 3 set forth an example process 300 for changing authentication keys when transmitting data using the example client 110 and server 130 of FIG. 2. An example will now be described using the example process 300 of FIG. 3 where a client 110 receives data packets out of sequential order from a server 130 as illustrated in the example timeline 400 of FIG. 4.

Figure 4:
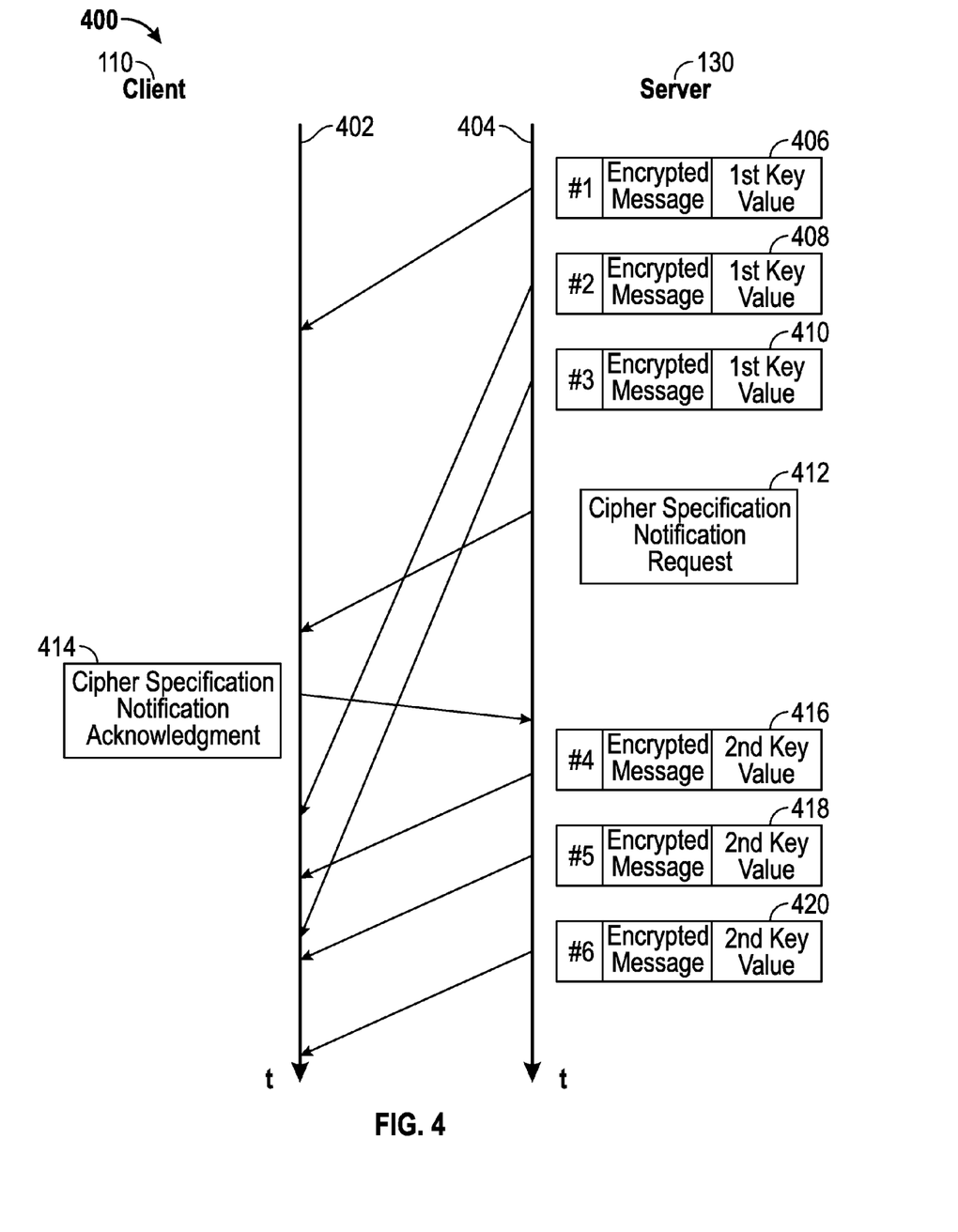
FIG. 4 is an example illustration of a timeline associated with the example process of FIG. 3.

The process 300 begins by proceeding from beginning step 301 when data is to be transmitted from the server 130 to the client 110 to step 302 when a first shared encryption key is applied by a server-side application 234 of the server 130 to a message to generate an encrypted message, and a first shared authentication key is applied by the server-side application 234 of the server 130 to the encrypted message to generate a sender-generated key value. In step 303, the server 130 sends a first data packet 406 having packet number 1 and including the encrypted message and the sender-generated key value to the client 110.

Turning to the client 110, in step 304 the client 110 receives the first data packet 406. A client-side application 222 on the client 110 applies the first shared authentication key to the encrypted message to generate a client-generated key value and compares the client-generated key value with the sender-generated key value. The client-generated key value and the sender-generated key value of the first data packet 406 match, so the client 110 decrypts the encrypted message of the first data packet 406 using the first shared encryption key.

Returning to the server 130, the server-side application 234 repeats the process 300 of steps 302 and 303 to generate and send, using the first authentication key and the first encryption key, a second data packet 408 having packet number 2 and a third data packet 410 having packet number 3 to the client 110. In step 305, the server 130 sends a cipher specification notification request 412 to the client 110 to request that subsequent data packets use key values generated using a second authentication key and a second encryption value. Returning to the client 110, in step 306 the client receives the cipher specification notification request 412 and responds by sending a cipher specification notification acknowledgment message 414 to the server 130 to acknowledge that subsequent data packets will include key values generated using the second authentication key and the second encryption value.

In step 307, the server-side application 234 applies the second authentication key to a message to generate a sender-generated key value, and in step 308 sends a fourth data packet 416 having packet number 4 and including the sender-generated key value and an encrypted second message using the second encryption key to the client 110.

In step 309, the client 110 receives the second data packet 408 having packet number 2 (and not the fourth data packet 416 having packet number 4) from the server 130. The out-of-order receipt of the second data packet 408 may be caused, for example, due to a lost packet or network delay. In step 310, the client-side application 222 applies the second authentication key to the second data packet 408 to generate a recipient-generated key value. It is determined in decision step 311 that the recipient-generated key value that is generated using the second authentication key does not match the sender-generated key value of the second data packet 408, so the process 300 proceeds to step 313 in which the client-side application 222 applies the first authentication key to the second data packet 408 to generate another recipient-generated key value. The process 300 proceeds to decision step 314. In decision step 314, it is determined that the recipient-generated key value that is generated using the first authentication key matches the sender-generated key value of the second data packet 408, so the process 300 proceeds to step 315 in which the encrypted message of the second data packet 408 is decrypted using the first encryption key.

The process 300 returns to step 309 when the client 110 receives the fourth data packet 416 having packet number 4 from the server 130. In step 310, the client-side application 222 applies the second authentication key to the fourth data packet 416 to generate a recipient-generated key value. It is determined in decision step 311 that the recipient-generated key value that is generated using the second authentication key matches the sender-generated key value of the fourth data packet 416, and the process 300 proceeds to step 313 in which the client-side application 222 decrypts the encrypted second message using the second encryption key. It is also determined by the client-side application 222 that data packets from the server 130 having a data packet number equal to or greater than packet number 4 will use the second encryption key and the second authentication key.

Returning to the server 130 in step 307, the server-side application 234 applies the second authentication key to a message to generate a sender-generated key value, and in step 308 sends a fifth data packet 418 having packet number 5 and including the sender-generated key value and an encrypted message using the second encryption key to the client 110.

The client 110, however, next receives the third data packet 410 having packet number 3 from the server 130 as the process 300 returns step 309, and the client-side application 222 in step 310, applies the second authentication key to the third data packet 410 to generate a recipient-generated key value. It is determined in decision step 311 that the recipient-generated key value that is generated using the second authentication key does not match the sender-generated key value of the third data packet 410, so the process 300 proceeds to step 313 in which the client-side application 222 applies the first authentication key to the third data packet 410 to generate another recipient-generated key value. The process 300 proceeds to decision step 314. In decision step 314, it is determined that the recipient-generated key value that is generated using the first authentication key matches the sender-generated key value of the third data packet 410, so the process 300 proceeds to step 315 in which the encrypted message of the third data packet 410 is decrypted using the first encryption key.

The process 300 again returns to step 309 upon receipt by the client 110 of the fifth data packet 418 having packet number 5 from the server 130. Identifying that the packet number 5 of the fifth data packet 418 is greater than packet number 4 of the fourth data packet 416 to which the second authentication key and the second authentication value were successfully applied, the client-side application 222 in step 310 applies the second authentication key to the fifth data packet 418 to generate a recipient-generated key value. It is determined in decision step 311 that the recipient-generated key value that is generated using the second authentication key matches the sender-generated key value of the fifth data packet 418, and the process 300 proceeds to step 313 in which the client-side application 222 decrypts the encrypted message of the fifth data packet 418 using the second encryption key.

Returning to step 307, the server-side application 234 applies the second authentication key to a message to generate a sender-generated key value, and in step 308 sends a sixth data packet 420 having packet number 6 and including the a sender-generated key value and an encrypted message using the second encryption key to the client 110.

The process 300 again returns to step 309 upon receipt by the client 110 of the sixth data packet 420 having packet number 6 from the server 130. Identifying that the packet number 6 of the sixth data packet 420 is greater than packet number 4 of the fourth data packet 416 to which the second authentication key and the second authentication value were successfully applied, the client-side application 222 in step 310 applies the second authentication key to the sixth data packet 420 to generate a recipient-generated key value. It is determined in decision step 311 that the recipient-generated key value that is generated using the second authentication key matches the sender-generated key value of the sixth data packet 420, and the process 300 proceeds to step 313 in which the client-side application 222 decrypts the encrypted message of the sixth data packet 420 using the second encryption key. The process 300 then ends.

Figure 5:
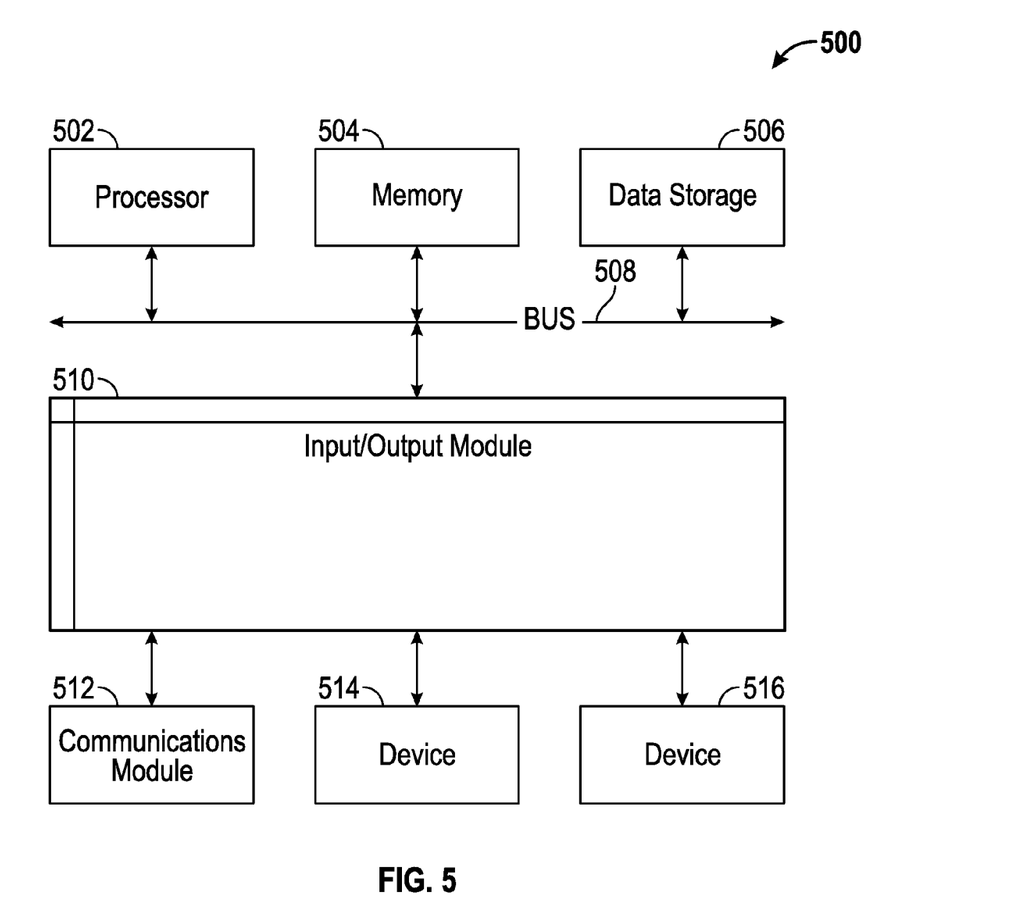
FIG. 5 is a block diagram illustrating an example computer system with which the client and server of FIG. 2 can be implemented.

FIG. 5 is a block diagram illustrating an example computer system 500 with which the client 110 and server of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for changing authentication keys when transmitting data, the method comprising:
   receiving a first data packet comprising a first sender-generated authentication value generated using a first authentication key, and a first message encrypted using a first encryption key;
   receiving an indication that subsequent data packets will include authentication values generated using a second authentication key;

receiving a second data packet comprising a second sender-generated authentication value and an encrypted second message;

applying the second authentication key to the second data packet to generate a recipient-generated authentication value;

when the recipient-generated authentication value that is generated using the second authentication key matches the second sender-generated authentication value, decrypting the encrypted second message; and when the recipient-generated authentication value that is generated using the second authentication key does not match the second sender-generated authentication value:

applying the first authentication key to the second data packet to generate another recipient-generated authentication value; and when the recipient-generated authentication value that is generated using the first authentication key matches the second sender-generated authentication value, decrypting the encrypted message using the first encryption key, wherein the first authentication key and the second authentication key comprise Message Authentication Code (MAC) keys, and wherein the first authentication key and the first encryption key are included in a first cipher specification.

2. The computer-implemented method of claim 1, wherein the indication that subsequent data packets will include authentication values generated using the second authentication key is received over an encrypted channel.

3. The computer-implemented method of claim 1, wherein the method further comprises transmitting an acknowledgement that the indication that subsequent data packets will include authentication values generated using the second authentication key has been received prior to applying the second authentication key to the second data packet to generate the recipient-generated authentication value.

4. The computer-implemented method of claim 1, wherein the first authentication key comprises a public authentication key and the second authentication key comprises a private authentication key.

5. The computer-implemented method of claim 1, wherein the first cipher specification comprises an Authenticated Encryption with Associated Data (AEAD) block cipher mode.

6. The computer-implemented method of claim 1, wherein receiving the indication that subsequent data packets will include authentication values generated using the second authentication key comprises receiving an indication that subsequent data packets will be generated according to a second cipher specification comprising the second authentication key and a second encryption key, and wherein decrypting the encrypted second message comprises decrypting the encrypted second message using the second encryption key.

7. The computer-implemented method of claim 1, wherein receiving the indication that subsequent data packets will include authentication values generated using the second authentication key comprises receiving a cipher specification notification.

8. The computer-implemented method of claim 1, wherein the first data packet comprises a first packet number, and the second data packet comprises a second packet number that succeeds the first packet number.

9. The computer-implemented method of claim 8, wherein when the recipient-generated authentication value that is generated using the second authentication key matches the second sender-generated authentication value, applying the second authentication key to each data packet comprising a packet number successive to the first packet number.

10. A system for changing authentication keys when transmitting data, the system comprising:

a memory comprising instructions; and a processor configured to execute the instructions to:

receive a first data packet comprising a first sender-generated authentication value generated using a first authentication key, and a first message encrypted using a first encryption key;

receive a cipher specification notification indicating that subsequent data packets will include authentication values generated using a second authentication key;

receive a second data packet comprising a second sender-generated authentication value and an encrypted second message;

apply the second authentication key to the second data packet to generate a recipient-generated authentication value;

when the recipient-generated authentication value that is generated using the second authentication key matches the second sender-generated authentication value, decrypt the encrypted second message; and when the recipient-generated authentication value that is generated using the second authentication key does not match the second sender-generated authentication value:

apply the first authentication key to the second data packet to generate another recipient-generated authentication value; and when the recipient-generated authentication value that is generated using the first authentication key matches the second sender-generated authentication value, decrypt the encrypted message using the first encryption key, wherein the first authentication key and the second authentication key comprise Message Authentication Code (MAC) keys, and wherein the first authentication key and the first encryption key are included in a first cipher specification.

11. The system of claim 10, wherein the indication that subsequent data packets will include authentication values generated using the second authentication key is received over an encrypted channel.

12. The system of claim 10, wherein the processor is further configured to transmit an acknowledgement that the indication that subsequent data packets will include authentication values generated using the second authentication key has been received prior to applying the second authentication key to the second data packet to generate the recipient-generated authentication value.

13. The system of claim 10, wherein the first authentication key comprises a public authentication key and the second authentication key comprises a private authentication key.

14. The system of claim 10, wherein the first cipher specification comprises an Authenticated Encryption with Associated Data (AEAD) block cipher mode.

15. The system of claim 10, wherein the processor being configured to receive the indication that subsequent data packets will include authentication values generated using the second authentication key comprises the processor being configured to receive an indication that subsequent data packets will be generated according to a second cipher specification comprising the second authentication key and a second encryption key, and wherein the processor being configured to decrypt the encrypted second message comprises the processor being configured to decrypt the encrypted second message using the second encryption key.

16. The system of claim 10, wherein the first data packet comprises a first packet number, and the second data packet comprises a second packet number that succeeds the first packet number.

17. The system of claim 16, wherein when the recipient-generated authentication value that is generated using the second authentication key matches the second sender-generated authentication value, applying the second authentication key to each data packet comprising a packet number successive to the first packet number.

18. A non-transitory machine-readable storage medium comprising machine-readable instructions for causing a processor to execute a method for changing authentication keys when transmitting data, the method comprising:

receiving a first data packet comprising a first sender-generated authentication value generated using a first Message Authentication Code (MAC) authentication key, and a first message encrypted using a first encryption key;

receiving a cipher specification notification message over an encrypted channel that subsequent data packets will be generated according to a second cipher specification comprising a second MAC authentication key and a second encryption key;

transmitting an acknowledgement that the second cipher specification notification has been received;

receiving a second data packet comprising a second sender-generated authentication value and an encrypted second message;

applying the second authentication key to the second data packet to generate a recipient-generated authentication value;

when the recipient-generated authentication value that is generated using the second authentication key matches the second sender-generated authentication value, decrypting the encrypted second message using the second MAC encryption key; and     when the recipient-generated authentication value that is generated using the second authentication key does not match the second sender-generated authentication value:

applying the first authentication key to the second data packet to generate another recipient-generated authentication value; and     when the recipient-generated authentication value that is generated using the first authentication key matches the second sender-generated authentication value, decrypting the encrypted message using the first encryption key,     wherein the first MAC authentication key and the first encryption key are included in a first cipher specification.

* * * * *